Nov. 3, 1964    G. B. GRIM    3,155,084
COOLING MEANS FOR INTERNAL COMBUSTION ENGINES
Filed March 28, 1962

INVENTOR.
GEORGE B. GRIM
BY
Fryer and Zemansky
ATTORNEYS

United States Patent Office 3,155,084
Patented Nov. 3, 1964

3,155,084
COOLING MEANS FOR INTERNAL
COMBUSTION ENGINES
George B. Grim, Washington, Ill., assignor to Caterpillar
Tractor Co., Peoria, Ill., a corporation of California
Filed Mar. 28, 1962, Ser. No. 183,090
6 Claims. (Cl. 123—41.77)

This invention relates to a cooling means for internal combustion engines and more particularly relates to a cooling means formed in a cylinder head insert arranged adjacent to the combustion chamber of an internal combustion engine.

The relatively large degree of engine expansion and contraction which occurs adjacent to the combustion chambers thereof, oftimes causes cracking of vital engine parts to thus decrease engine efficiency. Such cracks generally appear in the general area of the exhaust valve seats of the engine. These particular areas are subjected to a substantial amount of heat during engine operation.

Attempts have been made to remedy this problem by employing expandable inserts, for example, at these critical "hot spots" of the engine. Further attempts have comprised the provision of cooling passages around the heated engine portions. These attempts for the most part have necessitated the use of relatively complex and inefficient structures which tend to leak, break or otherwise fail when put into actual operation.

This invention has overcome many of the above described difficulties by providing a novel cooling arrangement for internal combustion engines. The basic novelty resides in the marriage of a valve insert with uniquely arranged channels formed therein. The channels form cooling passages with the engine head which passages are arranged to communicate with cooling chambers formed in the head and block of the engine in order to circulate a coolant closely adjacent to critical "hot spots" of the engine.

In accordance with the above discussions, an object of this invention is to provide a cooling means for internal combustion engines.

A further object of this invention is to provide a cooling arrangement adjacent to critical "hot spots" of an internal combustion engine which is relatively simple and durable in construction and highly efficient in operation.

Still further and more specific objects of this invention will become apparent in view of the following description and drawings wherein.

Figure 1:
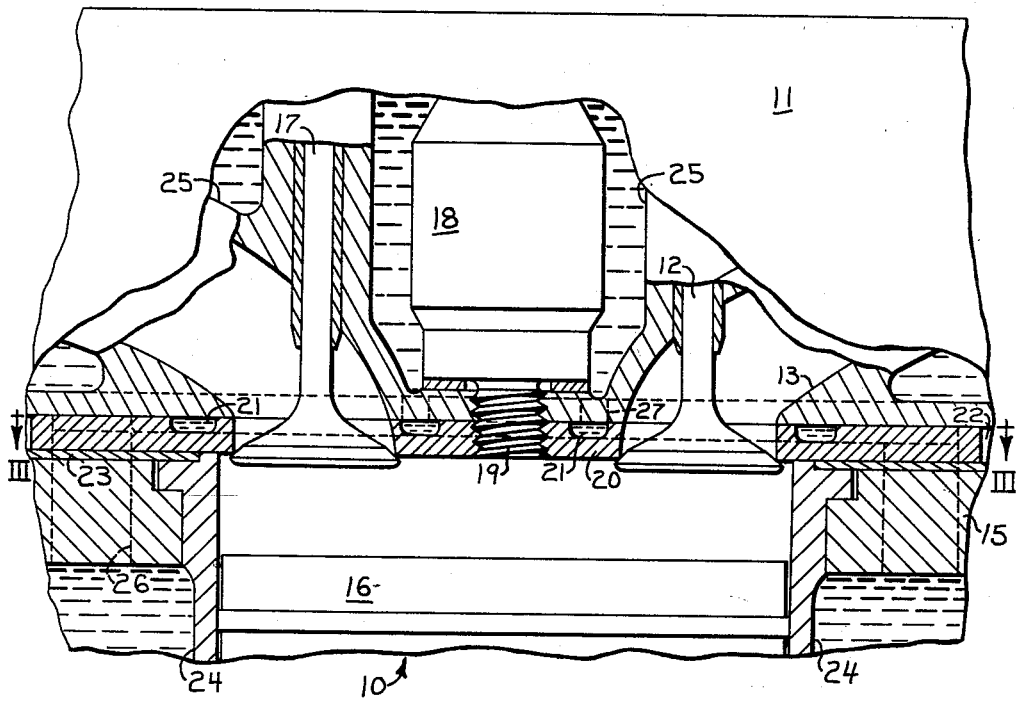
FIG. 1 is a partial elevational and cross-sectional view taken on line I—I in FIG. 3, disclosing the cooling arrangement of this invention as it would appear in combination with an internal combustion engine.

FIG. 1 discloses a portion of an internal combustion engine 10 as having a cylinder head 11 with standard exhaust valves 12 and exhaust ports 13 formed therein. The exhaust ports are arranged to communicate with a combustion chamber 14 formed in a cylinder block 15.

Figures 2, 3:
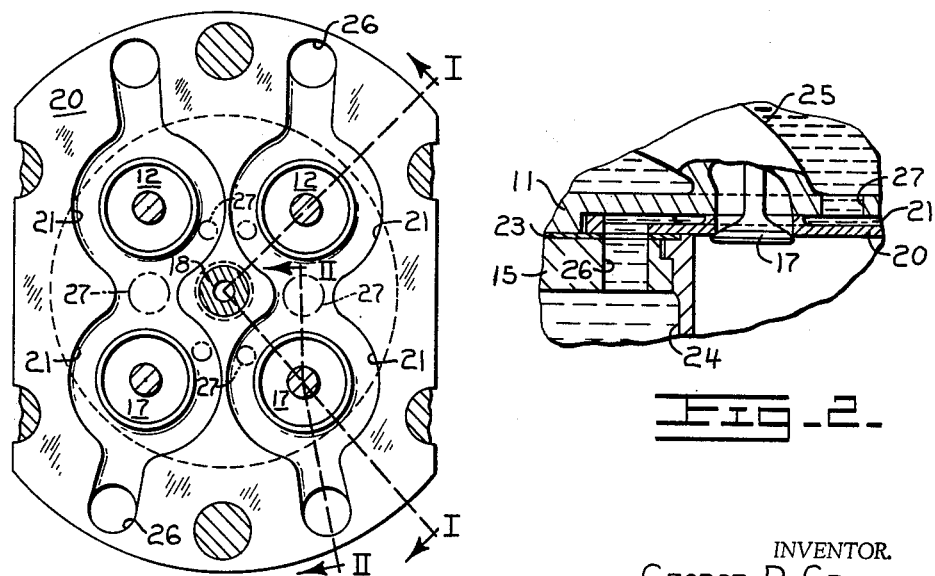
FIG. 2 is a cross-sectional view taken on line II—II in FIG. 3.
FIG. 3 is a cross-sectional view taken on line III—III in FIG. 1.

As is well known in the art, a reciprocating piston 16 is adapted to be actuated by means of a combustible fuel-air mixture received through suitable fuel injection means (not shown) and air inlet valves 17 (FIG. 3). This mixture is then ignited by a conventional precombustion means 18 which is secured to the engine by a threaded and hollowed throat portion 19. The exhaust gases formed are subsequently expelled from the combustion chamber through the exhaust ports 13 in a well known manner.

The novel cooling concepts of this invention provides a preferably hardened steel insert 20 with a plurality of channels 21 formed therein for cooling critical "hot spots" of the engine. As clearly illustrated in FIG. 3, channels or passage means 21 substantially comprise a uniform cross-section and a "figure eight" configuration on the insert member. Clearances 22 may be provided between the insert and cylinder head to permit limited radial expansion of the insert. However, as will be hereinafter more fully understood the novel cooling concepts of this invention virtually eliminate the need for such clearances.

The insert may be bonded to the cylinder head by conventional welding or brazing techniques or the like. However, if so desired a gasket member similar to gasket 23 which functions to form a seal between the cylinder block and the insert may be utilized in lieu thereof. As more clearly shown in FIG. 2 the passages 21 thus formed are arranged to communicate with cooling chambers 24 and 25 of the cylinder block and head, respectively, by means of connecting passages 26 and 27.

Referring now to FIG. 3, the insert channels which form coolant passages with the cylinder head are constructed and arranged in surrounding relationship with respect to the valves and precombustion means. Such an arrangement provides that the engine coolant may be circulated from chamber 24, through passages 26 and 21 and into chamber 25. The relatively small sectional area of passages 21 and their close relationship with respect to the valves and precombustion means provides for an efficient heat transfer arrangement in accordance with well known principles. Primarily due to the above described sealing arrangement existing between the insert, cylinder head and block, leakage from passages 21 is prevented. Thus, a durable and efficient cooling arrangement is provided for critical "hot spots" of the engine. Also, as above stated, the need for insert expansion clearances 22 is virtually eliminated.

I claim:

1. A cooling arrangement for an internal combustion engine having a combustion chamber formed in a cylinder block and valve means and precombustion means arranged in a cylinder head thereof in communicating relationship with said chamber for driving said engine comprising a substantially flat insert member arranged between said head and said block, said insert member forming passage means of substantially uniform cross-section with said head arranged to closely surround lower portions of said valve means and lower portions of said precombustion means, said lower portions comprising "hot spots" of said engine, said passage means communicating with coolant chamber means formed in said head arranged in surrounding relationship with said valve means and said precombustion means and chamber means formed in said block for circulating a coolant through said passage means.

2. The invention of claim 1 wherein said insert is constructed and arranged to form surface portions bonded to said head and said passage means comprises channel portions formed only in said insert member.

3. In an internal combustion engine having at least one combustion chamber formed in a cylinder block thereof, a cylinder head arranged in juxtaposed relation to said block and forming a bore therein which overlies said chamber, an insert member in the form of a plate arranged in said bore and further arranged in abutting and sealing relationship with said block and head, exhaust valve means formed in said head and said insert for communicating with said chamber for selectively receiving expelled exhaust gases therefrom, precombustion means arranged in said head and further arranged to extend therethrough and into secured relationship with said insert for selectively supplying ignition energy to said chamber, cooling means formed in said block and said head for effecting a cooling thereof and passage means communicating with the cooling means formed in said block and said head formed by said insert and said head and arranged closely adjacent to lower peripheral portions of said exhaust valve means and said precombustion means for circulating a coolant, said passage means comprising channel portions of substantially uniform cross-section formed in said insert.

4. In an internal combustion engine comprising a combustion chamber formed in a cylinder block and at least two valve means arranged in a cylinder head and further arranged to communicate with said combustion chamber, the invention which comprises a substantially flat insert member arranged between said cylinder block and said cylinder head, said insert member having passage means of substantially uniform cross-section arranged therein to closely surround said valve means for circulating a coolant therethrough at a substantially uniform flow rate.

5. The invention of claim 4 wherein two pairs of said valve means are arranged in said cylinder head and separate passage means are arranged to closely surround each pair of said valve means.

6. The invention of claim 4 wherein said passage means substantially comprises a "figure eight" configuration.

References Cited in the file of this patent

UNITED STATES PATENTS

| | | |
|---|---|---|
| 1,479,129 | Feilner | Jan. 1, 1924 |
| 2,077,225 | Daiber | Apr. 13, 1937 |
| 2,730,085 | Brill | Jan. 10, 1956 |
| 2,739,579 | Ware et al. | Mar. 27, 1956 |

FOREIGN PATENTS

| | | |
|---|---|---|
| 1,035,623 | France | Apr. 22, 1953 |
| 172,879 | Great Britain | Dec. 22, 1921 |
| 180,302 | Great Britain | Jan. 18, 1923 |